United States Patent [19]

Koenig

[11] Patent Number: 5,212,508
[45] Date of Patent: May 18, 1993

[54] REMOTE PHOTO-ELECTRIC INTERFACE IN CAMERA

[75] Inventor: Norbert Koenig, Rochester, N.Y.

[73] Assignee: Eastman Kodak Company, Rochester, N.Y.

[21] Appl. No.: 722,772

[22] Filed: Jun. 28, 1991

[51] Int. Cl.$^5$ .................................................. G03B 7/00
[52] U.S. Cl. ...................................... 354/21; 354/266; 354/275
[58] Field of Search .................. 354/21, 173.1, 173.11, 354/266

[56] References Cited

U.S. PATENT DOCUMENTS

| | | | |
|---|---|---|---|
| 3,514,617 | 5/1970 | Klyce | 250/227 |
| 3,558,895 | 1/1971 | Hartmann | 250/220 |
| 3,675,552 | 7/1972 | Papke | 95/11 V |
| 3,900,858 | 8/1975 | McCann et al. | 354/79 |
| 3,963,920 | 6/1976 | Palmer | 250/239 |
| 4,021,099 | 5/1977 | Kawasaki et al. | 350/96 C |
| 4,152,043 | 5/1979 | Albanese | 350/96.20 |
| 4,154,529 | 5/1979 | Dyott | 356/28 |
| 4,158,310 | 6/1979 | Ho | 73/705 |
| 4,270,050 | 5/1981 | Brogardh | 250/231 R |
| 4,315,147 | 2/1982 | Harmer | 250/227 |
| 4,376,566 | 3/1983 | Blackington | 350/96.2 |
| 4,405,197 | 9/1983 | Bejczy | 350/96.15 |
| 4,417,824 | 11/1983 | Paterson et al. | 400/477 |
| 4,429,231 | 1/1984 | DeLoach, Jr. et al. | 250/551 |
| 4,569,570 | 2/1986 | Brogardh et al. | 350/96.34 |
| 4,632,530 | 12/1986 | Iwata et al. | 354/173.11 |
| 4,649,271 | 3/1987 | Hok et al. | 250/227 |
| 4,721,970 | 1/1988 | Beaver | 354/21 |
| 4,774,407 | 9/1988 | Erbe | 250/227 |
| 4,799,756 | 1/1989 | Hirschfeld | 350/96.18 |
| 4,836,636 | 6/1989 | Obara et al. | 350/96.20 |
| 4,848,871 | 7/1989 | Seidel et al. | 350/96.29 |
| 4,972,214 | 11/1990 | Shibayama et al. | 354/173.1 |
| 5,023,642 | 6/1991 | Pagano | 354/275 |

*Primary Examiner*—Michael L. Gellner
*Assistant Examiner*—Howard B. Blankenship
*Attorney, Agent, or Firm*—Lawrence P. Trapani

[57] ABSTRACT

An apparatus for photo-electrically interfacing a mechanical camera component to an electrical camera component in a camera. The mechanical camera component has a sensing area associated therewith. The sensing area contains optically detectable information. The apparatus comprises a device for directing radiant energy to and from the sensing area. The radiant energy is incident upon at least a portion of the optically detectable information contained on the sensing area. A detecting device is optically coupled to the directing device for photodetecting radiant energy received from the optically detectable information. The detecting device provides an electrical output for receipt by an electrical camera component. The operational status of the mechanical camera component is determinable by the output of the detecting device. The directing device includes an optical fiber having a distal end and a proximal end. The distal end is remotely situated adjacent to the sensing area to permit emission of radiant energy thereon and reception of radiant energy reflected therefrom. The proximal end is locally situated adjacent to an electrical camera component and is optically coupled to the detecting device to permit photodetection of radiant energy reflected from the sensing area.

9 Claims, 3 Drawing Sheets

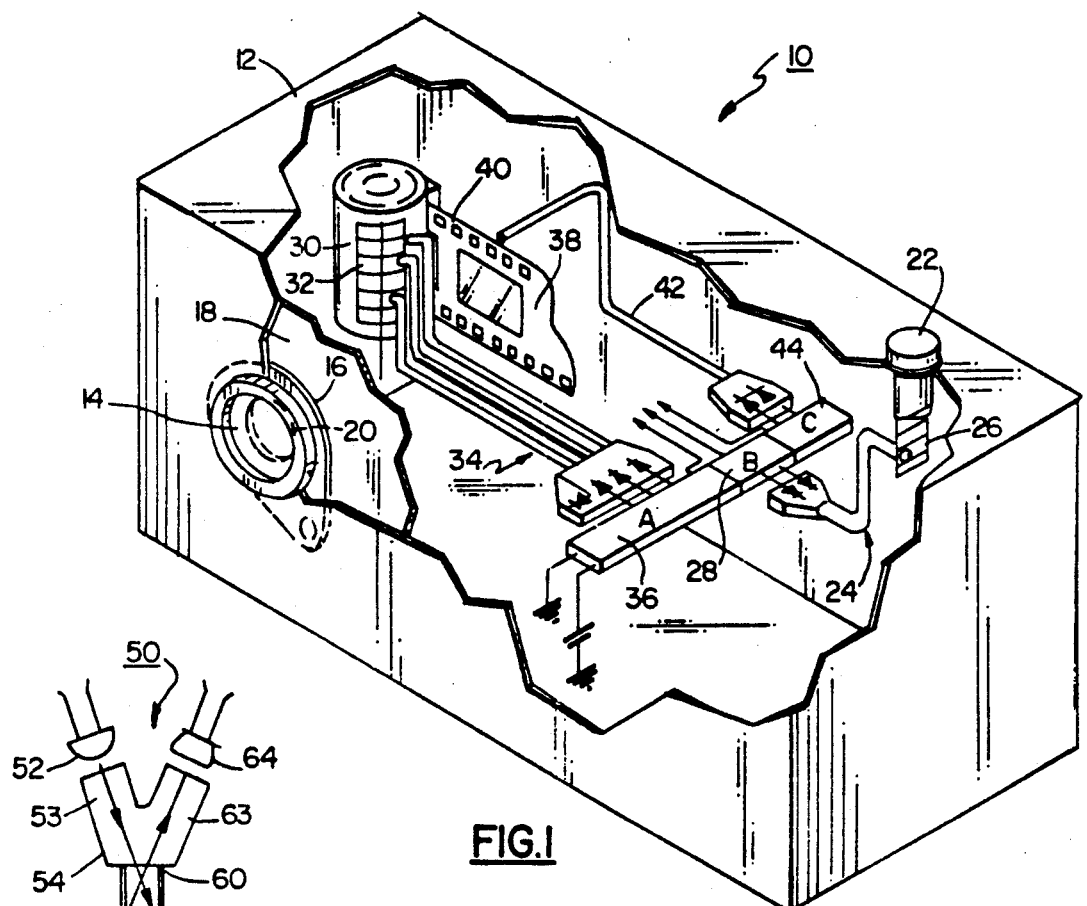
FIG.1
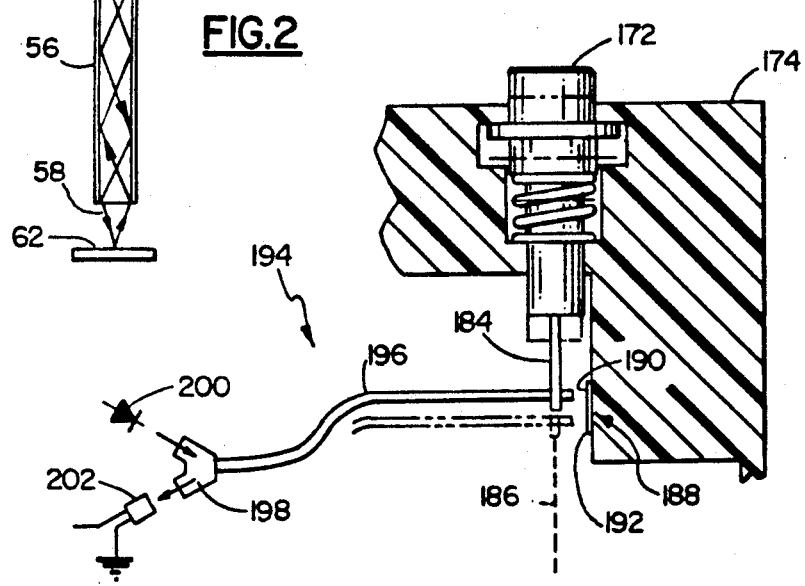
FIG.2
FIG.4

REMOTE PHOTO-ELECTRIC INTERFACE IN CAMERA

BACKGROUND OF THE INVENTION

1. Technical Field

The present invention relates generally to cameras and, more particularly, to photo-electric interfaces employed between mechanical and electrical apparatus in cameras.

2. Background Art

In a conventional camera, both mechanical and electrical systems are employed to carry out various camera functions, such as operating the shutter, controlling the flash illumination, and advancing the film.

The mechanical systems commonly found in cameras are those that take information from the operator and direct it to the photographic process. For example, the operation of the shutter is initiated by a shutter release button switch. As another example, the presence of film is sensed when the film is inserted into the camera causing a plunger switch to be depressed.

The electrical or electronic systems commonly found in a camera generally receive information about the actions of the mechanical systems so that they may respond appropriately in implementing the photographic process. For example, when the shutter release button is pressed, it mechanically closes an electrical circuit which is usually connected to a shutter drive circuit. Upon closure of the electrical circuit, the shutter drive circuit is activated to cause the shutter to open and permit the taking of a photograph.

The interface between these mechanical and electrical camera systems is typically accomplished by some type of electro-mechanical switch requiring, in many cases, intricate mechanical assemblies. In addition, electrical contacts and conductors are necessary to transmit information from the switch to the controlling circuitry and/or electronics.

The mechanical switch assemblies have a substantial drawback in that they occupy a relatively large amount of space, which is scarce in many camera designs. Also, these assemblies must be deployed close to where the mechanical systems are situated. Further, because these assemblies require a number of moving parts, they have a relatively low reliability and high manufacturing cost.

The contacts and conductors associated with electro-mechanical switches also introduce the potential for reliability problems caused by oxidation, contamination or corrosion. Also, the electrical contacts and conductors require soldering which introduces additional potential reliability problems. Further, the assembly of these electro-mechanical components in a camera contribute significantly to the overall manufacturing cost of the camera.

SUMMARY OF THE INVENTION

It is therefore a general object of the present invention to provide an interface between the mechanical and electrical systems of the camera that avoids the problems associated with the prior art.

It is a more specific object of the present invention to provide a remote photo-electric interface between the mechanical and electrical systems of the camera.

It is another object of the present invention to provide a photo-electric interface that eliminates the need for electro-mechanical switches and their associated electrical contacts, conductors, and soldering, between the mechanical and electrical systems of the camera.

It is a further object of the present invention to provide a photo-electric interface between the mechanical and electrical systems of a camera that is more reliable to operate and less costly to manufacture than conventional electro-mechanical interfaces.

It is yet another object of the present invention to provide a photo-electric interface in a camera that has a reduced requirement for space within the camera housing and facilitates the layout design of components within the camera housing.

These and other objects are attained in accordance with the present invention wherein there is provided an apparatus for photo-electrically interfacing a mechanical camera component to an electrical camera component in a camera. The mechanical camera component has a sensing area associated therewith. The sensing area contains optically detectable information. The apparatus comprises a device for directing radiant energy to and from the sensing area. The radiant energy is incident upon at least a portion of the optically detectable information contained on the sensing area. A detecting device is optically coupled to the directing device for photodetecting radiant energy received from the optically detectable information. The detecting device provides an electrical output for receipt by an electrical camera component. The operational status of the mechanical camera component is determinable by the output of the detecting device.

The directing device includes an optical fiber having a distal end and a proximal end. The distal end is remotely situated adjacent to the sensing area to permit emission of radiant energy thereon and reception of radiant energy reflected therefrom. The proximal end is locally situated adjacent to an electrical camera component and is optically coupled to the detecting device to permit photodetection of radiant energy reflected from the sensing area.

A method of photo-electrically interfacing a mechanical camera component to an electrical camera component is also contemplated by the present invention. The method comprises the steps of (1) directing a source of radiant energy through an optical conductor having a proximal end and a distal end; (2) emitting the radiant energy from the distal end of the optical fiber onto a sensing area associated with the mechanical camera component; and (3) sensing optically detectable information contained on the sensing area from which the operational status of the mechanical camera component can be determined. The method may further comprise the step of controlling a camera function in response to the determined status of the mechanical camera component.

BRIEF DESCRIPTION OF THE DRAWINGS

Further objects of the present invention together with additional features contributing thereto and advantages accruing therefrom, will be apparent from the following description of the preferred embodiments which are shown in the accompanying drawings, in which:

FIG. 1 is a front perspective view, partly diagrammatic, and with parts broken away to show the essential elements of the present invention;

FIG. 2 schematically illustrates the photo-electric interface of the present invention;

FIG. 4 is a schematic illustration of an alternative embodiment of the first example of FIG. 3;

DESCRIPTION OF THE PREFERRED EMBODIMENTS

Figure 3:
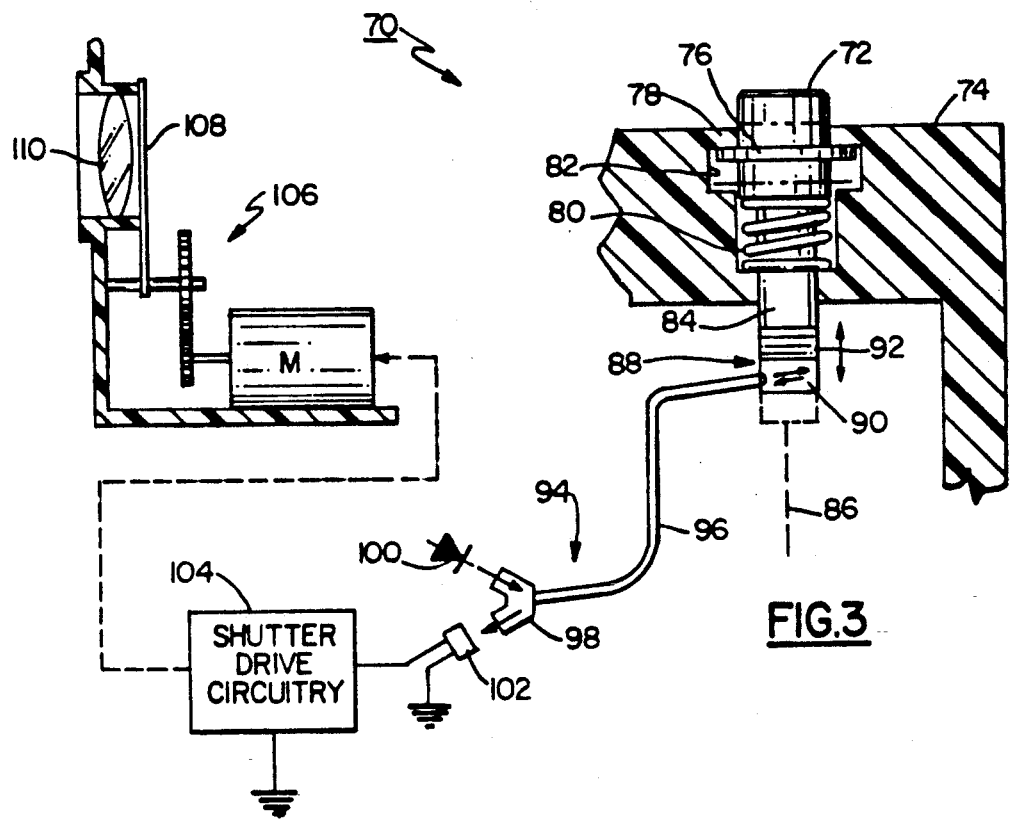
FIG. 3 is a schematic illustration of a first example of the present invention configured as part of a camera shutter system.

Referring to FIG. 1 of the drawings, there is shown a camera 10 having a camera housing 12. Camera housing 12 contains a taking lens 14 for focusing an image of the target scene onto photographic film. A shutter element 16 is pivotally mounted to an internal wall 18 contained within housing 12. Internal wall 18 contains an opening 20. Opening 20 is aligned with the optical axis of lens 14. When shutter element 16 is in the open position target scene light passes through opening 20 to the photographic film.

With further reference to FIG. 1, there is shown both mechanical and electrical camera components employed to carry out various camera functions. An electrical camera component may comprise a control circuit for controlling a particular function of a camera. A camera function may include, for example, operating the shutter, exciting the flash illuminator, indicating the presence of film, and advancing the film.

One type of mechanical camera component is a shutter release button 22 mounted in the top wall of camera housing 12. Optically coupled to button 22 is a photo-electric interface 24 configured according to the present invention. Interface 24 is optically coupled to a sensing area 26 contained on release button 22, and is electrically connected to a shutter drive circuit 28, as shown in FIG. 1. As will be described in further detail with reference to FIGS. 3 and 4, interface 24 is able to monitor and detect the operational positions of release button 22.

Another type of mechanical camera component is a photographic film cartridge 30, containing film for taking pictures with camera 10. Included on the outside wall of cartridge 30 is a sensing area 32 that constitutes a DX sensing code. The DX sensing code consists of a two by six record of clear (metal of film cartridge) and black painted squares. The record contains coded information about the film, such as the number of exposures, the film type and film speed. Optically coupled to cartridge 30 is another embodiment of a photo-electric interface 34 configured according to the present invention. Interface 34 includes a plurality of optical fibers having their distal ends disposed adjacent to sensing area 32 of film cartridge 30. Interface 34 is optically coupled to the sensing area 32 and in position to sense a portion of the DX sensing code that provides film speed information. Interface 34 is electrically connected to electronic circuitry 36 which decodes the DX code and determines the film speed. This information is utilized by other camera circuitry that controls the operation of the flash illuminator and shutter. A more detailed description of this embodiment is provided below with reference to FIG. 5.

Yet another type of mechanical camera component is the photographic film itself as shown at 38. Film 38 contains a sensing area constituting a perforated edge area 40 of the film. Optically coupled to sensing area 40 is a further embodiment of a photo-electric interface 42 configured according to the present invention. As shown in FIG. 1, interface 42 is in position to monitor the relative position of film 38, as it advances from film cartridge 30. Interface 42 is electrically connected to a motor control circuit 44 which, in turn, controls a motor (not shown) that effects advancement of film 38.

It is apparent from FIG. 1 that the present invention provides the advantage of sensing the status of remotely distributed mechanical camera components without having to place sensing and switching elements along side these components. In the preferred embodiment of the present invention, all of the active elements are centrally located adjacent to the camera control circuitry, as shown in FIG. 1. Optical sensing takes the place of electro-mechanical switching. The operational status of these mechanical components is detected by running optical fibers between the centrally located optical sensor elements and the remotely located components.

A photo-electric interface 50 configured according to the present invention is shown in FIG. 2. Interface 50 comprises a light source 52 which may be a light emitting diode (LED) operating in the infrared or visible red frequency spectrum. Light source 52 is optically coupled to an optical beamsplitter 54, the construction of which is well known in the optical art. An optical coupler may also be employed in lieu of optical beamsplitter 54. An optical fiber 56 is optically coupled to beamsplitter 54. Optical fiber 56 has a distal end 58 and a proximal end 60. Proximal end 60 of optical fiber 56 is directly attached to a bi-directional port of beamsplitter 54 by way of cement or butt welding. Other well known attachment methods may be employed.

Optical fiber 56 is designed for bi-directional operation. As shown in FIG. 2, optical fiber 56 provides a means for directing radiant energy to and from a sensing area 62. Infrared or visible red light is emitted from LED 52 and coupled into an input branch 53 of beamsplitter 54. The light is then coupled into fiber 56 and directed to distal end 58. The light is emitted from distal end 58 and falls incident on sensing area 62. Depending on the properties of sensing area 62, the light may be reflected therefrom and received back into optical fiber 56 through distal end 58. As shown in FIG. 2, the reflected light is directed back through fiber 56 to beamsplitter 54. The reflected light is then directed to an output branch 63 of beamsplitter 54. The reflected light exits output branch 63 and is coupled to a photodetector 64. Photodetector 64 may be a photodiode or phototransistor. Photodetector 64 converts the reflected light to an electrical current having a magnitude that is proportional to the flux density of the reflected light. As contemplated by the present invention, the current signal generated by photodetector 64 is utilized by various camera control circuits, as more fully described with reference to FIGS. 3, 5 and 7.

As used herein, the terms reflect or reflector are not limited to a specular reflection or reflector. For example, a scattering effect is also included within the meaning of these terms.

Referring to FIG. 3, there is shown a first example of the present invention, configured as part of a camera shutter apparatus 70. Shutter apparatus 70 includes a mechanical camera component in the form of a shutter release button 72. Shutter release button 72 is mounted within a camera housing 74 and contains a radially projecting rim 76, as shown in FIG. 3. A shoulder 78 is formed in housing 74. As shown in FIG. 3, rim 76 is urged against shoulder 78 by a compression spring 80 which is contained in a compartment 82. Release button 72 further comprises an elongated member 84 which projects downward along an operational axis 86.

Elongated member 84 has included on its surface a sensing area 88. Sensing area 88 contains optically detectable information comprising a reflective surface 90 and a non-reflective surface 92. Both surfaces are aligned along operational axis 86, as shown in FIG. 3.

Button switch 72 is displaceable along operational axis 86 between an open position (solid lines) and a closed position (phantom lines), as shown in FIG. 3. A first operational status of release button 72 is the open position, and a second operational status of button 72 is the closed position.

With further reference to FIG. 3, there is shown a photo-electric interface 94 configured according to the present invention. Interface 94 comprises an optical fiber 96 connected at a proximal end to an optical beamsplitter 98. An LED 100 is mounted at the input branch of beamsplitter 98 and a photodiode 102 is mounted at the output branch of beamsplitter 98. The electrical current output of photodiode 102 is connected to a shutter drive circuit 104. Shutter drive circuit 104 provides the necessary control voltage to operate an electro-magnetic shutter mechanism 106. Shutter mechanism 106 includes a flip-flop shutter 108, which is mounted adjacent to a taking lens 110.

In operation, LED 100 generates red visible light which is conducted through optical beamsplitter 98 and optical fiber 96. This source of red light is emitted from the distal end of optical fiber 96 and falls incident onto reflective surface 90. A portion of the visible red light reflected from surface 90 is received back into optical fiber 96 and directed to photodiode 102 at the output branch of beamsplitter 98. The reflected light causes a high level current signal to be generated at the output of photodiode 102. The current signal is monitored by shutter drive circuit 104. Under these circumstances, shutter drive circuit 104 recognizes the operational status of release button 72 to be the open position.

When release button 72 is depressed from its open position to its closed position, sensing area 88 is displaced downward along operational axis 86. In the closed position, non-reflective surface 92 is now directly in front of the distal end of optical fiber 96. The red light being emitted from optical fiber 96 is now incident upon non-reflective surface 92. In this case, the incident red light is absorbed by surface 92 and no reflective component of light is detected by photodetector 102. As a result, the current signal from photodetector 102 drops off to a low level, and this condition is detected by drive circuit 104. Under these circumstances, drive circuit 104 recognizes the operational status of release button 72 to be the closed position. Drive circuit 104 then activates electro-magnetic shutter mechanism 106, causing shutter 108 to open and permit the taking of a picture.

Referring to FIG. 4, there is shown an alternative embodiment of the example shown in FIG. 3. In FIG. 4, like elements are referenced by numerals corresponding to those in FIG. 3, but increased by a value of 100. In the embodiment shown in FIG. 4, a shutter release button 172 is mounted in a camera housing 174. Release button 172 comprises an elongated member 184 which contains an opening therethrough. Release button 172 is displaceable along an operational axis 186.

As shown in FIG. 4, a sensing area 188 is mounted on an interior wall of housing 174. Sensing area 188 contains optically detectable information comprising a reflective surface 190 and a non-reflective surface 192. A photo-electric interface 194, configured according to the present invention, comprises an optical fiber 196, an optical beamsplitter 198, an LED 200, and a photodiode 202. The distal end of optical fiber 196 is fixedly mounted in the opening of elongated member 184, as shown in FIG. 4.

In operation, the distal end of optical fiber 196 is positioned in front of reflective surface 190 when button 172 is in its open position. The open position status of button 172 is detected by interface 194, as earlier described with reference to FIG. 3. When release button 172 is depressed to a closed position (phantom lines), elongated member 184 is displaced downward along operational axis 186, thus deflecting optical fiber 196 as shown in FIG. 4. When fiber 196 is in its deflected position, its distal end is directly in front of non-reflective surface 192. This operational status is detected by interface 194, as earlier described with reference to FIG. 3.

Figure 5:
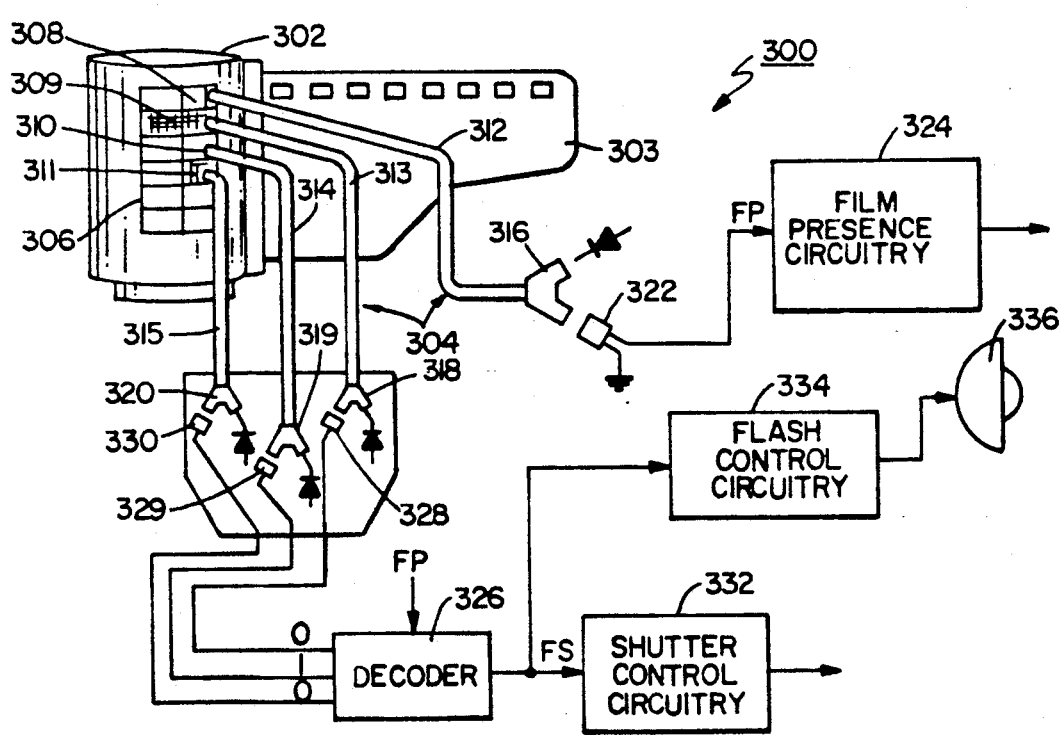
FIG. 5 is a schematic illustration of a second example of the present invention configured as part of a system for controlling the camera flash illumination and shutter operation.

Referring to FIG. 5, there is shown a second example of the present invention, configured as part of a camera control apparatus 300. Camera control apparatus 300 involves three primary camera functions. They include film presence/absence switching, flash and exposure control and shutter operation control. Camera apparatus 300 includes a mechanical camera component in the form of a photographic film cartridge 302. Cartridge 302 contains a roll of photographic film having certain properties, such as the number of exposures, the exposure latitude, film type, and film speed. Film cartridge 302 has included on its surface a sensing area 306 which contains optically detectable information of reflective and non-reflective regions. In this example, sensing area 306 is a coded record constituting the conventional DX sensing format. Four squares 308-311 of the record are employed to determine the film speed. Squares 308 and 310 each define a reflective surface. Squares 309 and 311 each define a non-reflective surface. In the example of FIG. 5, the operational status of film cartridge 302 is the film speed specification, as defined by the DX sensing code.

In FIG. 5, a photo-electric interface 304 is configured, according to the present invention, to optically read the film speed specification from the exterior surface of film cartridge 302. Photo-electric interface 304 comprises four optical fibers 312-315. Optical fiber 312 has a distal end positioned adjacent to reflective surface 308 and a proximal end connected to a beamsplitter 316. Optical fibers 313-315 each have distal ends positioned adjacent to surfaces 309-311 respectively. Optical fibers 313-315 each have proximal ends connected to optical beamsplitters 318-320 respectively. Beamsplitters 316 and 318-320 each have an emitter-detector pair associated therewith, as schematically shown in FIG. 5. In the preferred embodiment, the emitter is a visible red LED and the detector is a photodiode or phototransistor.

Referring to FIG. 5, a photodetector 322 has its electrical output connected to a film presence circuit 324 and a decoder 326. Photodetectors 328-330 have their electrical outputs connected to decoder 326. The electrical output of decoder 326 is connected to both a shutter control circuit 332 and a flash illuminator/exposure control circuit 334.

Operation of the individual apparatus of interface 304 has already been described in detail with reference to FIG. 2. The overall operation of interface 304 in camera apparatus 300 is described as follows. First, the presence of film cartridge 302 is sensed by the optical sensing system comprising fiber 312, beamsplitter 316 and photodetector 322. A film presence signal FP is generated by detector 322 upon detection of visible red light reflected from surface 308. The film presence signal is received by film presence circuit 324. Circuit 324 may, for example, energize a light indicator to inform the user that film is loaded in the camera. Circuit 324 may also be used to switch the camera from a fully operational mode, when film is present in the camera, to a "dry cycle" mode when film is not present.

As shown in FIG. 5, the film presence signal generated by detector 322 is also received by decoder 326. This signal is used to trigger decoder 326 to read its inputs from detectors 328-330. The film speed code, represented by square surfaces 309-311, is detected by detectors 328-330. The output of detector 328 is low (or zero) because light generated by its associated LED is not reflected from surface 309. The output of detector 329 is high (or one) because light generated by its associated LED is reflected from surface 310. The output of detector 330 is low (or zero) because light generated by its associated LED is not reflected from surface 311. In FIG. 5, the output of detectors 328-330 represent the binary number 010. If the film presence signal from detector 322 is high, the decoder reads the binary number 010 and generates a signal FS representative of the film speed. The film speed signal FS is used by shutter control circuit 332 to adjust control parameters for shutter operation in a well known manner. Flash control circuit 334 also receives the film speed signal and uses it to adjust control parameters for operation of a flash illuminator 336.

Figure 6:
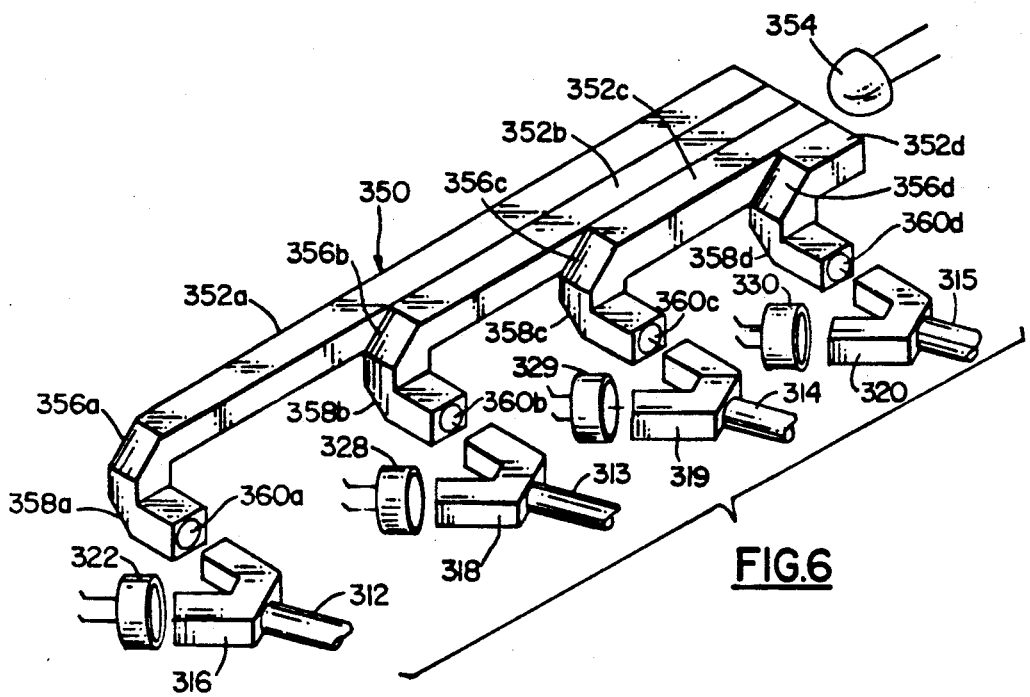
FIG. 6 is a perspective view of an alternative embodiment of the optical conductor portion of the present invention as used in the second example of FIG. 5.

Referring to FIG. 6, there is shown a preferred embodiment of the optical conductor portion of the present invention, as used in the example of FIG. 5. Referring to FIG. 6, there is shown a light transmission member 350 having four light channels 352a-352d. Light transmission member 350 is made of a clear, plastic material such as acrylic plastic. Light is supplied to light transmission member 350 by a red visible light LED 354. Most of the light flux entering transmission member 350 remains therein due to the phenomenon of total internal reflection. The surfaces 356 and 358 are designed to contain a surface area large enough to reflect by total internal reflection, all of the light energy so as to change its direction of travel. Once the light is reflected from surfaces 358a-358d, it emanates through surfaces 360a-360d, where it is coupled into optical beamsplitters 316 and 318-320 respectively. Accordingly, a single LED can be utilized to operate photoelectric interface 304 in the example shown in FIG. 5.

Figure 7:
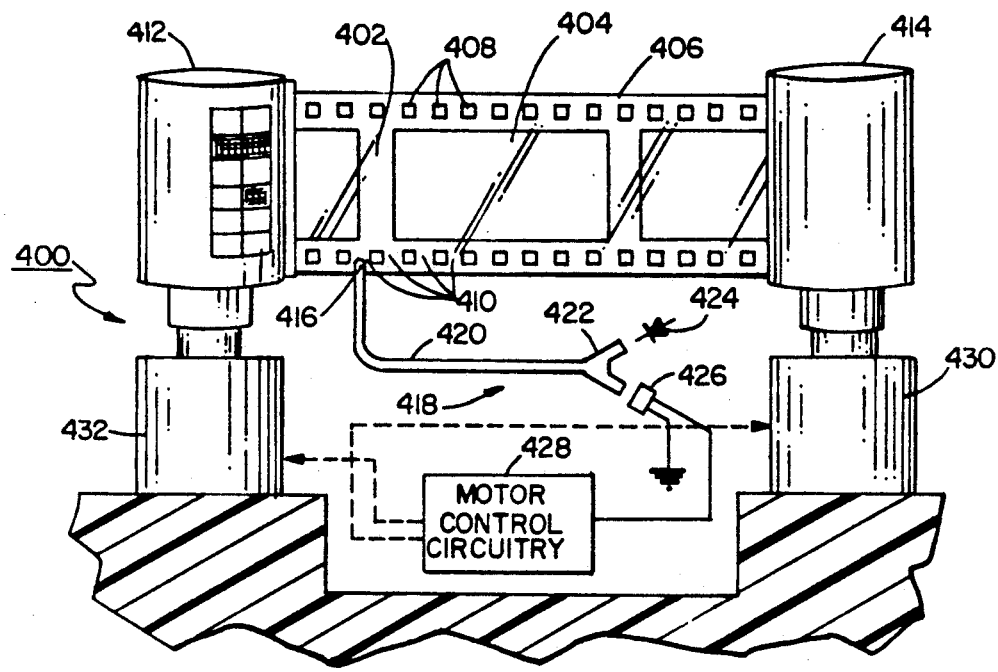
FIG. 7 is a schematic illustration of a third example of the present invention configured as part of a system for controlling the advancement of film in a camera.

Referring to FIG. 7, there is shown a third example of the present invention, configured as part of a camera apparatus 400 for controlling the advancement of film in a camera. In this example, the mechanical camera component is the photographic film itself, shown in FIG. 7 at 402. Film 402 comprises an exposure area 404 and an edge area 406. Contained within the edge area 406 are sprocket holes or perforations 408.

As shown in FIG. 7, there are eight sprocket holes along the bottom edge area 406 associated with a single exposure area. The bottom edge area of film 402 constitutes the sensing area in this example. The sensing area comprises optically detectable information in the form of fiducial areas 410 and adjacent sprocket holes 408. Each sensing area comprises 8 sprocket holes and a corresponding number of fiducial areas.

As shown in FIG. 7, film 402 is advanced from a film cartridge 412, and received in a take-up spool 414. The operational status of film 402 is its position relative to a sensing point 416, as shown in FIG. 7. This operational status is sensed by a photo-electric interface 418 configured according to the present invention.

With further reference to FIG. 7, interface 418 comprises a single optical fiber 420, an optical beamsplitter 422, an LED 424, and a photodetector 426. The optical sensing operation of interface 418 has already been described with reference to FIG. 2. In this example, photo-electric interface 418 performs the function of meter sensing which includes detecting the movement of the film, as it advances, and determining when to stop the film for a new exposure. The distal end of optical fiber 420 is located at sensing point 416.

As the film advances from film cartridge 412, fiducial areas 410 and sprocket holes 408 pass by the distal end of fiber 420. Light generated from LED 424 is directed to sensing point 416. The light is reflected from fiducial areas 410. It passes through sprocket holes 408 and is absorbed into a back screen (not shown). Every time a fiducial area passes by the distal end of fiber 420, photodetector 426 receives a reflected component of the source light and generates an electrical signal. This signal is received by motor control circuit 428. When a sprocket hole passes by the distal end of fiber 420, photodetector 426 does not detect reflected source light and its output goes low. Thus, as the film is advanced, a train of signal pulses is generated at the output of photodetector 426.

Motor control circuit 428 counts the train of signal pulses, and causes the advancement of film 402 to stop after eight pulses are detected. Upon detection of the eight pulses, motor control circuit 428 generates a control signal which is received by a take-up motor 430. The control signal causes take-up motor 430 to stop, thereby stopping the advancement of film 402.

Motor control circuit 428 also determines at what point film 402 should be rewound by a rewind motor 432. Motor control circuit 428 accomplishes this task by monitoring pulses detected during film advancement. When the film is fully advanced, fiducial areas 410 and sprocket holes 408 cease moving past the distal end of optical fiber 420. As a result, the pulse train generated by interface 418 ceases. This condition is detected by motor control circuit 428 and, if take-up motor 430 is still activated, circuit 428 deactivates motor 430 and issues a control signal to a rewind motor 432 to cause film 402 to be rewound into film cartridge 402.

While the invention has been described in the specification and illustrated in the drawings with reference to a preferred embodiment, it will be understood by those skilled in the art that various changes may be made and equivalents may be substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out this invention, but that the invention will include any embodiments falling within the scope of the appended claims.

I claim:

1. An apparatus for photo-electrically interfacing a mechanical camera component to an electrical camera component in a camera, said mechanical camera component having a sensing area associated therewith, the sensing area containing optically detectable information, said apparatus comprising an optical fiber having a distal end and a proximal end, the distal end being remotely situated adjacent to the sensing area of said mechanical camera component to permit emission of incident radiant energy thereon and reception of reflected radiant energy therefrom, means, optically coupled to the proximal end of said optical fiber, for emitting radiant energy into said optical fiber, and means, optically coupled to the proximal end of said optical fiber, for photodetecting reflected radiant energy received from the optically detectable information of said sensing area, said photodetecting means providing an electrical output signal in response to the reflected radiant energy detected, said electrical output signal being received by said electrical camera component, whereby the operational status of said mechanical camera component is determinable from the output of said photodetecting means.

2. An apparatus as recited in claim 1, further comprising a beamsplitter having a bi-directional port, an input port, and an output port, said bi-directional port being coupled to the proximal end of said optical fiber, said output port being coupled to said photodetecting means, and said input port being coupled to said emitting means, whereby incident radiant energy generated by said emitting means is coupled to the input port of said beamsplitter and directed through the bi-directional port of said beamsplitter and the proximal end of said optical fiber, the incident radiant energy is then directed through said optical fiber and emitted out of its distal end onto the optically detectable information of said sensing area, radiant energy reflected from said sensing area is coupled into the distal end of said optical fiber, directed through said optical fiber and said beamsplitter, and then coupled to said photodetecting means through the output port of said beamsplitter.

3. An apparatus as recited in claim 1, wherein said mechanical camera component constitutes photographic film, said film being movable between a film cartridge and a take-up spool, the optically detectable information of said sensing area comprising a plurality of reflective regions disposed between a corresponding plurality of sprocket holes contained in said film, the distal end of said optical fiber being situated in a sensing position such that the plurality of reflective regions and sprocket holes pass by said sensing position when said film is moved between the film cartridge and the take-up spool, whereby the number of reflective regions and corresponding sprocket holes that pass by said sensing position are determinable from the output of said photodetecting means.

4. An apparatus for photo-electrically sensing a film cartridge in a camera, said film cartridge being removably contained in said camera, said film cartridge having a sensing area located thereon and photographic film contained therein, said apparatus comprising means for photodetecting radiant energy reflected from the sensing area, said photodetecting means providing a first electrical output signal in response to the reflected radiant energy detected; and means, optically coupled to said sensing area and said photodetecting means, for directing incident radiant energy to the sensing area of said film cartridge and reflected radiant energy to said photodetecting means, said directing means includes an optical fiber having a proximal end optically coupled to a source of incident radiant energy and a distal end positioned to emit incident radiant energy onto the sensing area, whereby the presence of said film cartridge is detectable from the state of the first output signal of said photodetecting means.

5. An apparatus as recited in claim 4, wherein said directing means further includes a second optical fiber having a proximal end optically coupled to a source of incident radiant energy and a distal end, the sensing area of said camera film cartridge further comprises a coded record located thereon, the distal end of said second optical fiber being positioned to emit incident radiant energy onto said coded record, the reflective nature of said coded record providing information about a property of the film contained in said film cartridge, said photodetecting means providing a second electrical output signal in response to detected radiant energy reflected from said coded record, whereby the information represented by said coded record is determinable from the second output of said photodetecting means.

6. A method of photo-electrically interfacing a mechanical camera component to an electrical camera component in a camera, which method comprises the steps of:

directing a source of incident radiant energy through an optical conductor having a proximal end and a distal end;

emitting the radiant energy from the distal end of the optical conductor onto optically detectable information associated with said mechanical camera component;

receiving through the distal end of the optical conductor radiant energy reflected from the optically detectable information;

directing the reflected radiant energy through the optical conductor to its proximal end;

photodetecting the reflected radiant energy from the proximal end of the optical conductor and generating an electrical output signal in response thereto; and determining the operational status of said mechanical camera component from the electrical output signal.

7. A method as recited in claim 6, further comprising the step of controlling a camera function in response to the determined status of said mechanical camera component.

8. An apparatus for photo-electrically interfacing a shutter release button to an electrical camera component in a camera, said button being displaceable along an operational axis between a first position and a second position and having a sensing area associated therewith, the sensing area containing a substantially reflective region and a substantially non-reflective region, said apparatus comprising means, optically coupled to said sensing area, for directing incident radiant energy to and reflected radiant energy from the sensing area of said button, said directing means includes an optical fiber having a proximal end optically coupled to a source of incident radiant energy, and a distal end, the distal end of said optical fiber being positioned to emit incident radiant energy onto the reflective region of the sensing area when said release button is in said first position and onto the non-reflective region of the sensing area when said release button is in said second position; and means, optically coupled to said directing means, for photodetecting reflected radiant energy received from the reflective region of the sensing area, said photodetecting means providing an electrical output signal in response to the reflected radiant energy detected, said electrical output signal being received by said electrical camera component, whereby the position of said shutter release button is determinable from the output of said photodetecting means.

9. An apparatus for photo-electrically sensing a film cartridge in a camera, said film cartridge being removably contained in said camera, said film cartridge having a coded record located thereon and photographic film contained therein, said coded record containing a plurality of information regions, said apparatus comprising means optically coupled to the information regions of said coded record for directing incident radiant energy thereto and reflected radiant energy therefrom, said directing means includes a plurality of optical fibers each having a proximal end optically coupled to a source of incident radiant energy and a distal end positioned to emit incident radiant energy onto a respective information region, the reflective nature of the information regions providing information about the film contained in said film cartridge, means, optically coupled to said directing means, for photodetecting radiant energy reflected from the information regions of said coded record, said photodetecting means providing an electrical output in response to the reflected radiant energy;

whereby the information represented by the regions of said coded record is determinable from the electrical output of said photodetecting means.

* * * * *